United States Patent [19]

Sandberg

[11] 4,445,794
[45] May 1, 1984

[54] SELF-LOCKING THREADED BEARING AND BEARING ASSEMBLY AND METHOD OF MAKING SUCH ASSEMBLY

[75] Inventor: Christopher T. Sandberg, Owatonna, Minn.

[73] Assignee: Truth Incorporated, Owatonna, Minn.

[21] Appl. No.: 398,954

[22] Filed: Jul. 16, 1982

[51] Int. Cl.³ .................. F16C 35/02; B23P 11/00; E05F 11/00; F16B 29/00
[52] U.S. Cl. ............................ 384/428; 29/432; 29/437; 49/324; 308/236; 403/274; 411/263; 411/412
[58] Field of Search .......... 384/295, 296, 301, 429, 384/435, 437, 431; 49/324; 403/274, 276, 282, 284; 308/236; 411/411, 412, 417, 263; 29/432, 437

[56] References Cited
U.S. PATENT DOCUMENTS

| Re. 28,907 | 7/1976 | Eibes et al. ............... 411/417 |
|---|---|---|
| 662,115 | 11/1900 | Dikeman ................. 384/431 |
| 2,347,910 | 5/1944 | Johnson ................... 411/307 |
| 2,349,593 | 5/1944 | Hosking .................. 411/311 |
| 2,360,826 | 10/1944 | Cherry ..................... 411/166 |
| 2,564,076 | 8/1951 | Parks et al. ............. 384/429 X |
| 3,020,039 | 2/1962 | Hynes et al. ............. 49/324 |
| 3,118,479 | 1/1964 | Crowther ................ 411/307 |
| 4,253,276 | 3/1981 | Peterson et al. ......... 49/249 |

Primary Examiner—Stuart S. Levy
Assistant Examiner—Thomas R. Hannnon
Attorney, Agent, or Firm—Wood, Dalton, Phillips, Mason & Rowe

[57] ABSTRACT

The self-locking threaded bearing is an externally threaded tubular member having a discontinuous thread to form thread sections which are spaced-apart axially on the bearing. In the bearing assembly, the thread sections engage portions of an internal thread in a bore of a housing for the bearing and, with the internal thread being more ductile than the thread sections of the bearing, portions of the internal thread are stripped to pack into the space between the thread sections and assist in locking the bearing into the housing.

In the method of making the self-locking threaded bearing assembly, a tubular bearing is provided with a discontinuous external thread and a housing is formed with a bore having an internal thread of the same pitch as the external thread of the bearing and of material more ductile than that of the external thread. The bearing is threadably advanced into the bore of the housing and while being prevented from further advance the bearing is rotated through at least one additional revolution to distort and partially strip the internal thread to prevent retractive rotation of the bearing and with stripped thread material packed into the space between the thread sections of the bearing to assist in locking the bearing against axial movement in the bore. Subsequently, a force exerted on the bearing in a direction acting to move the bearing outwardly of the bore sets the trailing ends of the thread sections of the external thread into embedded relation with the internal thread to lock the bearing against radial movement.

9 Claims, 11 Drawing Figures

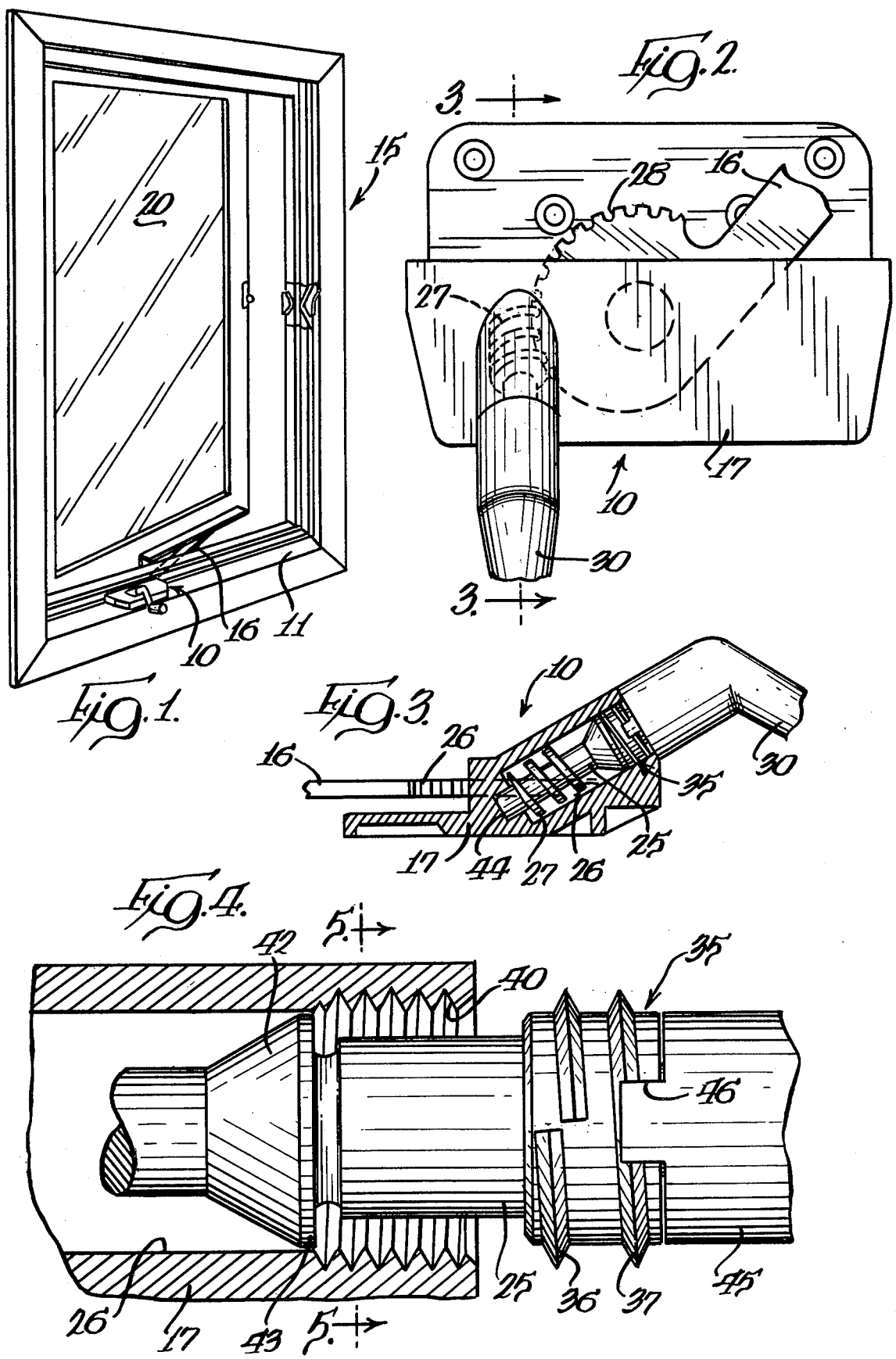

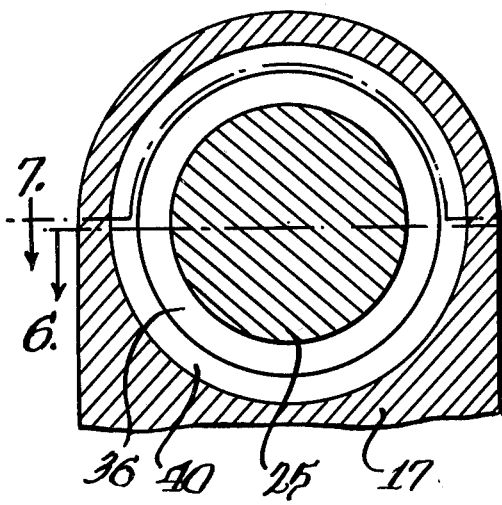
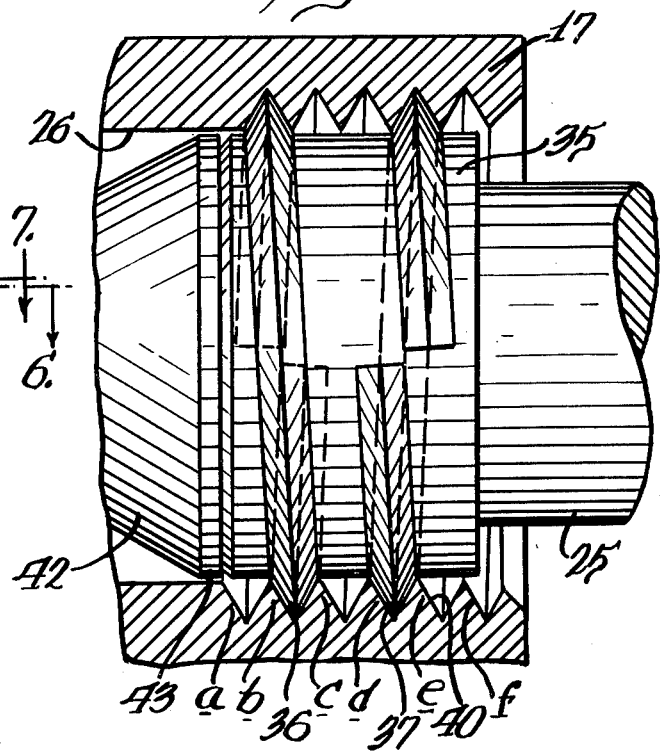
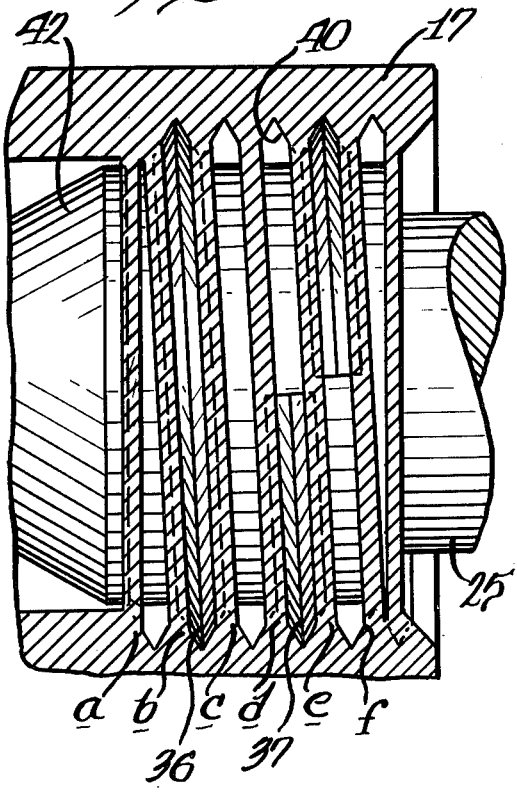
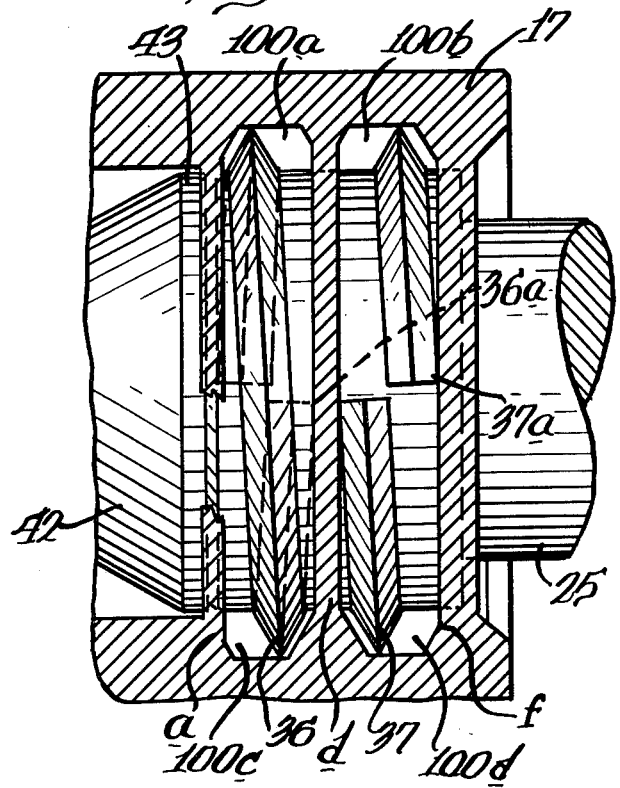

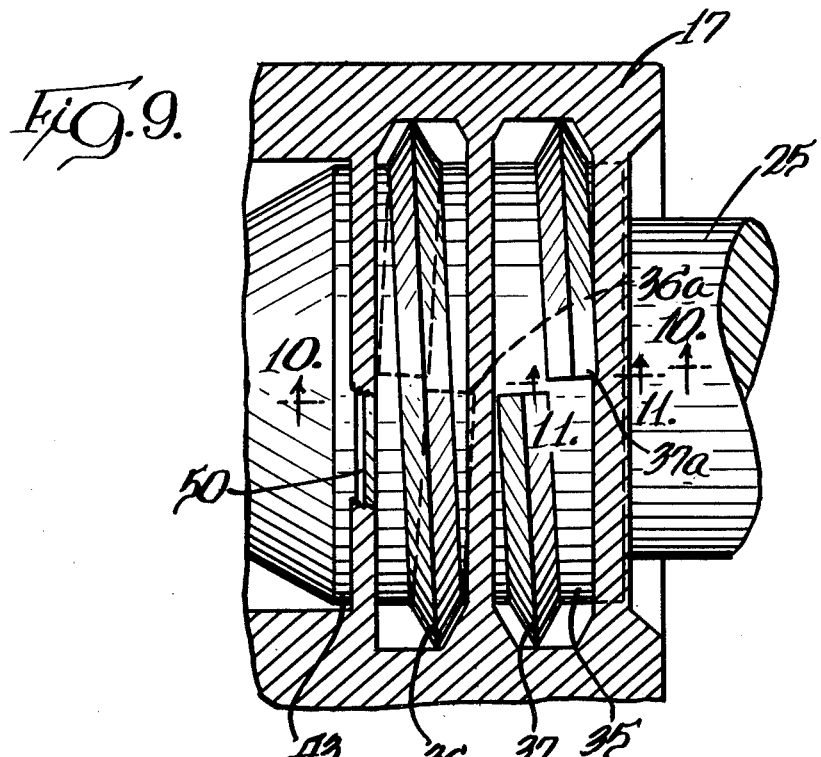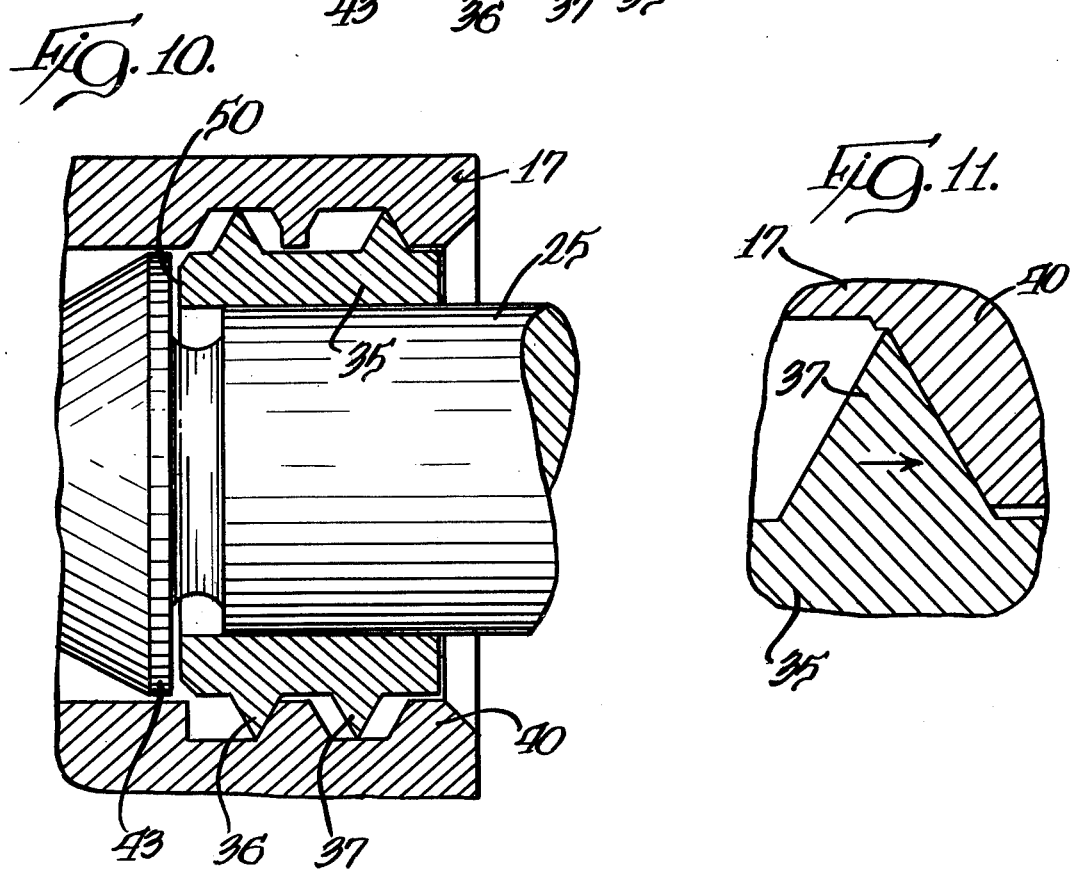

SELF-LOCKING THREADED BEARING AND BEARING ASSEMBLY AND METHOD OF MAKING SUCH ASSEMBLY

BACKGROUND OF THE INVENTION

This invention pertains to a self-locking threaded bearing and to an assembly utilizing such bearing as well as a method of making the assembly and, more particularly, to a window operator structure wherein an input shaft is rotatably mounted within the bearing and the self-locking feature of the bearing assembly prevents removal of the input shaft and the bearing.

One example of the utility of the self-locking threaded bearing is in use in a window operator wherein rotation of an input shaft, having a worm gear which engages a worm wheel on an operator arm, causes movement of a window. In such a structure, the input shaft is associated with a bearing and the bearing is then threaded into a bore in the housing. A structure of this general type is shown in U.S. Pat. No. 4,253,276, owned by the assignee of this application. In the prior structure, after the bearing was threaded into position, it was held in place by use of an additional structural element, such as a pin wedged in the interengaging threads of the bearing and the housing, which required an additional step in the assembly operation and, therefore, increased the cost of the product. The present invention relies upon the stripping of portions of one thread of interengaging threads in order to lock a bearing in position. It is known in the art to distort, or strip, threads in order to lock one member to another; however, the prior art does not show accomplishing this by providing a discontinuity in one of the interengaging threads and causing the locking action to occur by further rotation of the bearing at the end of its rotative advancing movement.

SUMMARY OF THE INVENTION

A primary feature of the invention is to provide a self-locking threaded bearing having an intermittent or discontinuous thread which can be advanced into working position by interengagement with a more ductile internal thread in a housing bore receiving the bearing and which, when held against further advance, is given further rotation to distort and strip the internal thread and lock the bearing against removal.

Still another feature of the invention is to provide a self-locking threaded bearing assembly and a method of making such assembly wherein a bearing is formed with an external intermittent or discontinuous thread to provide spaced-apart thread sections, a housing with a bore is provided with an internal continuous thread in the bore which is more ductile than the external thread of the bearing, threading the bearing into the bore and rotating the bearing until the bearing advances to a position where the bearing is blocked from further advance and, thereafter, rotating the bearing at least one additional revolution to lock the bearing by having the external thread sections strip parts of the continuous internal thread and pack the stripped material behind the thread sections of the bearing.

Still another feature of the invention is to provide a self-locking bearing assembly by the method defined in the preceding paragraph and wherein the bearing is also locked against radial movement by imparting a force in a direction tending to remove the bearing from the bore which embeds the trailing ends of said thread sections into adjacent parts of the internal thread.

With the foregoing structure and method, it is possible to thread the bearing into place with a suitable tool and, as part of the same assembly operation, impart further rotation to the bearing by the same tool and with the bearing held against further advance whereby the continued driving torque causes the thread sections of the external thread on the bearing to disrupt the internal thread of the housing and shear out, or strip, some of the internal thread to cause packing of stripped thread material in the space between the thread sections of the bearing for permanently locking the bearing in the housing.

A further object of the invention is to provide a new and improved window operator having a self-locking threaded bearing for holding an input shaft of the operator in a located position, both axially and radially of a bore in the housing of the operator.

BRIEF DESCRIPTION OF THE DRAWINGS

FIG. 1 is a perspective elevational view of a window with the window sash shown in partially-open position and having a window operator mounted on the window frame;

FIG. 2 is a fragmentary plan view of the window operator shown in FIG. 1 and on an enlarged scale;

FIG. 3 is a vertical section, taken generally along the line 3—3 in FIG. 2;

FIG. 4 is a fragmentary sectional view of part of the window operator housing shown in FIG. 3 on an enlarged scale and showing an intermediate step in the assembly of an input shaft and self-locking threaded bearing with the housing;

FIG. 5 is a sectional view, taken generally along the line 5—5 in FIG. 4 and with the bearing seated;

FIG. 6 is a sectional view, on an enlarged scale, taken generally along the line 6—6 in FIG. 5 and showing the bearing in its advanced, seated position;

FIG. 7 is a sectional view, taken generally along the line 7—7 in FIG. 5 and generally similar to the view of FIG. 6, and showing the undamaged internal thread in the housing bore in section;

FIG. 8 is a view similar to FIG. 7 showing the bearing locked to the housing after additional rotation of the bearing and stripping of portions of the internal thread;

FIG. 9 is a view similar to FIG. 8 showing the final working position of the bearing and the locking action of the bearing to the housing thread resulting from a force acting in a direction to remove the bearing from the housing;

FIG. 10 is a sectional view, taken generally along the line 10—10 in FIG. 9; and FIG. 11 is a sectional view, taken generally along the line 11—11 in FIG. 9.

DESCRIPTION OF THE PREFERRED EMBODIMENT

One application of the self-locking threaded bearing is as a component of a window operator, illustrated generally in FIGS. 1 to 3. The window operator, indicated generally at 10, is mounted on a sill 11 of a window frame, indicated generally at 15, and has an operator arm 16 which is pivoted relative to a fixed pivot axis within a housing 17 of the window operator to position an end thereof coacting with a window sash 20 for desired positioning of the window sash. The window operator has an input shaft 25 positioned within a bore 26 of the housing and a worm gear 27 which coacts with a worm wheel 28 associated with the operator arm 16. Rotation of a handle 30 connected to the outer end of the input shaft results in movement of the operator arm 16 through the interengaging gears.

The input shaft 25 is held in position within the bore 26 of the housing by means of a self-locking threaded bearing, indicated generally at 35. The bearing 35 has a tubular body and has an intermittent external thread to provide discontinuous thread sections 36 and 37 each of which extends substantially completely around the body of the bearing. The thread sections are spaced apart axially of the bearing to provide a gap therebetween which, if the thread were continuous, would include at least one additional thread section extending around the bearing to connect the ends of the thread sections 36 and 37. The external thread of the bearing coacts with an internal thread 40 formed at one end of the housing bore 26. As seen in FIG. 6, the external thread of the bearing and the internal thread 40 of the housing are of the same pitch whereby the bearing, in assembly, can be threadably advanced by rotation thereof to an initial working or seated position, shown in FIG. 6. More particularly, the assembly is accomplished by associating the bearing 35 with the input shaft 25 which extends therethrough and, thereafter, the input shaft is advanced into the bore 26 of the housing and the bearing 35 rotatably advanced to the position of FIG. 6. The input shaft 25 has a frustoconical section 42 intermediate the ends thereof defining a shoulder 43 at an end thereof against which the bearing 35 abuts at the initial working position shown in FIG. 6. The shoulder 43, in effect, defines a fixed abutment because the extreme end 44 of the input shaft bottoms against the end of the housing bore 26.

Referring again to FIG. 4, the input shaft and bearing are shown in initially-assembled relation and the input shaft in its fully-inserted position in the housing bore. A drive tool 45, such as a tubular drive spanner surrounding the input shaft 25, engages in a pair of notches at an end of the bearing with one of the notches being shown at 46 whereby the tool can be advanced to position the bearing 35 in threaded engagement with the internal thread 40 and, thereafter, rotated and advanced to advance the bearing to the initial working position shown in FIG. 6 against the shoulder 43 of the input shaft. In the stage of assembly, shown in FIG. 6, no locking action has occured. The locking action occurs as a result of at least one further revolution of the bearing 35 while held against advance from the initial working position and a selection of materials or suitable material treatment whereby the internal thread 40 is more ductile than the external thread on the bearing. For example, the bearing could be brass and the housing of plastic material. Another example is a housing of cast zinc and the bearing with a hardened steel thread.

In FIGS. 6 and 7, sections of the internal thread 40 are identified by letters a through f. The further revolution of the bearing 35 causes a stripping action which results in the configuration shown in FIG. 8. The internal thread sections a, d and f are basically undamaged, while the thread sections b and c and e have been stripped or sheared out and packed into the spaces 100a, 100b, 100c, and 100d between the external thread sections 36 and 37 of the bearing and the remaining undamaged internal threads a, d and f. As shown in FIG. 8, this results in at least the trailing ends 36a and 37a of the bearing external thread sections being in contact with the internal thread of the housing bore to resist axial force. The packed debris from the stripped threads and the discontinuity in the internal thread lock the bearing against removal from the housing.

The discontinuity of the external thread on the bearing reduces the amount of internal thread to be stripped and minimizes the force required to strip the housing internal thread, while there are still sufficient external thread sections on the bearing and undamaged internal thread to resist axial load encountered during use of the window operator. In this locked initial working position, the leading end of the bearing 35 is in contact with the shoulder 43 on the input shaft. As part of the assembly operation or in initial use of the operator, a force is imparted to the bearing 35 in a direction tending to remove the bearing from the housing, with the result that the trailing ends 36a and 37a of the thread sections 36 and 37 which may be considered to be negative leads are embedded in the internal thread as shown in FIGS. 9 and 11 which locks the bearing against radial movement with respect to the housing bore. This results in a space, indicated at 50 in FIGS. 9 and 10, between the leading end of the bearing 35 and the shoulder 43. This sets the magnitude of backlash between the input shaft and the bearing. This embedding of the thread section ends can be obtained, as mentioned, by initial operation of the window operator since the reactive force on the worm gear tends to urge the bearing outwardly of the housing.

In view of the foregoing description, it will be evident that the threaded bearing can be locked into a housing by a continuation of the driving force which initially inserts the bearing and without an undue requirement of force for stripping the internal thread of the housing because of the intermittent nature of the thread sections on the bearing which still leave adequate sections, together with packed material formed by stripped internal thread, to hold the bearing in position against axially-exerted forces.

The method of making such an assembly includes the steps of forming the bearing with the external thread having intermittent or discontinuous thread sections to provide a gap therebetween, as by removing portions of a continuous thread or forming the thread sections in raised peripheral ribs formed integrally with the bearing, forming an internal thread in a bore of a housing to receive the bearing and which is more ductile than the external thread, rotatably advancing the bearing into the housing and, with further advance of the bearing being blocked, imparting an additional one revolution of rotation to the bearing to strip and deform the more ductile internal thread to lock the bearing in the housing against axially-applied force. An additional step in the method is to exert an axial force in a direction tending to withdraw the bearing which causes the negative lead trailing ends of the external thread sections to embed into the internal thread of the housing.

I Claim:

1. A self-locking threaded bearing assembly comprising, a housing having a bore with an internal thread extending along at least a part of the length of the bore, a bearing having an external thread, said threads being of the same pitch whereby the bearing can rotatably advance along the bore to a working position by interengagement of said threads, said housing threads being more ductile than the bearing threads, and the external thread of the bearing being discontinuous whereby rotation of the bearing at the working position without advance thereof causes partial stripping of the housing thread to lock the bearing axially in the housing with some of the stripped housing thread packed into the areas in which there is no bearing external thread and with parts of the external thread in contact with unstripped portions of the internal thread.

2. A self-locking threaded bearing assembly as defined in claim 1 wherein the discontinuity in the external thread defines axially spaced-apart disconnected thread sections with the trailing ends of said thread sections being embedded in said unstripped portions of the internal thread.

3. A self-locking threaded bearing assembly comprising, a housing with a bore, a bearing in said bore, a discontinuous external thread on said bearing, and means for locking the bearing in said bore including deformed sections of an internal thread in said bore engaging the external thread and material packed around the bearing in the space between sections of the external thread and derived from stripping of sections of the internal thread.

4. A window operator having an input shaft with a worm gear adapted to engage a worm wheel, a housing for rotatably mounting said shaft and having a bore in which a bearing for said shaft is positioned, and means for locking said bearing in position including an external discontinuous thread on said bearing to define axially spaced-apart disconnected thread sections and a plurality of annular grooves in the wall of said housing bore defined by thread sections of an internal thread spaced apart distances approximately equal to the distances between thread sections of the external thread and with parts of said housing deformed and captured between said thread sections of the external thread.

5. A window operator having a housing for rotatably mounting an input shaft by means of a bearing locked to the housing comprising, a bearing with an external thread, a bore in the housing to receive the bearing and having an internal thread which is more ductile than the external thread of the bearing, the threads being of the same pitch and the external thread on the bearing being discontinuous, and means for limiting the depth to which the bearing can be inserted into the bore whereby the bearing is advanced to said depth by rotation of the bearing and interengagement of the threads and locked to the housing by further rotation which partially strips the internal thread.

6. A window operator as defined in claim 5 wherein said input shaft has a worm gear for coaction with a worm wheel and a shoulder which abuts said bearing, and initial operation of said input shaft imparts a reactive force to set the trailing ends of the external thread at the discontinuities into the internal thread.

7. The method of making an assembly for support of a rotatable shaft by a bearing locked in a housing comprising, forming a bearing with an external discontinuous thread to provide spaced-apart thread sections, forming the housing with a bore having an internal continuous thread which is more ductile than said external thread, threading the bearing into the bore and rotating the bearing until the bearing advances to a position where the bearing is blocked from further advance, and rotating the bearing at least one additional revolution to lock the bearing by having the external thread sections strip parts of the continuous internal thread and pack the stripped material behind the thread sections.

8. A method of locking a bearing in a housing wherein the housing has a bore with an internal thread to threadably receive the bearing which has an external thread, the threads of the bore being more ductile than those of the bearing and both threads being of the same pitch and the bearing thread being discontinuous comprising, rotating the bearing in the bore to advance the bearing to a working position, and rotating the bearing at least one additional revolution while preventing further advance thereof to shear out parts of the internal thread and lock the bearing in the bore.

9. A self-locking externally threaded bearing for threading into a housing having a more ductile internal thread and which can be rotated while held against axial movement to have the external thread shear off parts of said more ductile internal thread to lock the bearing in the housing against axial movement consisting of, a tubular body with a central opening to rotatably receive a member, an external thread on said body, means defining a discontinuity in the external thread intermediate the length of said tubular body to have said external thread define two separate thread sections spaced apart lengthwise of the tubular body and with said discontinuity providing a space adapted to receive said sheared-off parts of the internal thread, and means on said tubular body for facilitating use of a tool for rotation of said bearing into a housing, said bearing being free of any section of displaced threads which draws said external thread into tight frictional engagement with the internal thread.

* * * * *